US008228670B2

(12) United States Patent
Fahey et al.

(10) Patent No.: US 8,228,670 B2
(45) Date of Patent: Jul. 24, 2012

(54) PERIPHERAL STORAGE DEVICE

(76) Inventors: James T Fahey, San Francisco, CA (US); Michael Page McGirr, Lafayette, CA (US)

( * ) Notice: Subject to any disclaimer, the term of this patent is extended or adjusted under 35 U.S.C. 154(b) by 129 days.

(21) Appl. No.: 12/581,768

(22) Filed: Oct. 19, 2009

(65) Prior Publication Data

US 2010/0220435 A1   Sep. 2, 2010

Related U.S. Application Data

(60) Provisional application No. 61/106,809, filed on Oct. 20, 2008.

(51) Int. Cl.
*G06F 1/16* (2006.01)

(52) U.S. Cl. ............ 361/679.32; 361/679.31; 361/679.4; 361/679.41; 455/556.1; 455/558; 312/223.1; 312/223.2

(58) Field of Classification Search ............... 361/679.3, 361/679.4, 679.41, 679.55, 679.56
See application file for complete search history.

(56) References Cited

U.S. PATENT DOCUMENTS

| | | | | |
|---|---|---|---|---|
| 5,227,953 A * | 7/1993 | Lindberg et al. | ......... | 361/679.41 |
| 5,265,951 A * | 11/1993 | Kumar | ......... | 312/223.2 |
| 5,606,594 A * | 2/1997 | Register et al. | ......... | 455/556.2 |
| 5,822,546 A * | 10/1998 | George | ......... | 710/303 |
| 5,936,609 A * | 8/1999 | Matsuoka et al. | ......... | 345/156 |
| 6,600,657 B1 * | 7/2003 | Yerazunis et al. | ......... | 361/737 |
| 6,801,787 B1 * | 10/2004 | Page et al. | ......... | 455/556.1 |
| 6,931,266 B2 * | 8/2005 | Miyoshi et al. | ......... | 455/572 |
| 6,994,575 B1 * | 2/2006 | Clark et al. | ......... | 439/173 |
| 7,147,163 B2 * | 12/2006 | Salvato et al. | ......... | 235/472.02 |
| 7,203,777 B2 * | 4/2007 | Morita et al. | ......... | 710/74 |
| 7,425,813 B2 * | 9/2008 | Tashiro | ......... | 320/112 |
| 7,583,499 B2 * | 9/2009 | Lin et al. | ......... | 361/679.58 |
| 7,647,129 B1 * | 1/2010 | Griffin, Jr. | ......... | 700/94 |
| 7,660,601 B2 * | 2/2010 | Janik et al. | ......... | 455/556.1 |
| 7,719,830 B2 * | 5/2010 | Howarth et al. | ......... | 361/679.41 |
| D638,423 S * | 5/2011 | Anderson et al. | ......... | D14/356 |
| D639,297 S * | 6/2011 | Anderson et al. | ......... | D14/356 |
| 7,983,034 B1 * | 7/2011 | Mohoney | ......... | 361/679.41 |
| 8,000,820 B2 * | 8/2011 | Griffin, Jr. | ......... | 700/94 |
| 8,086,332 B2 * | 12/2011 | Dorogusker et al. | ......... | 700/94 |
| 8,092,251 B2 * | 1/2012 | Rosenblatt | ......... | 439/536 |
| 2002/0163780 A1 * | 11/2002 | Christopher | ......... | 361/686 |
| 2003/0016487 A1 * | 1/2003 | Tung-Chieh et al. | ......... | 361/679 |
| 2003/0201970 A1 * | 10/2003 | Liu | ......... | 345/156 |
| 2004/0039862 A1 * | 2/2004 | Hunt et al. | ......... | 710/304 |
| 2005/0002160 A1 * | 1/2005 | Chen et al. | ......... | 361/683 |
| 2005/0014531 A1 * | 1/2005 | Findikli | ......... | 455/557 |
| 2005/0181756 A1 * | 8/2005 | Lin | ......... | 455/344 |
| 2006/0116009 A1 * | 6/2006 | Langberg et al. | ......... | 439/76.1 |
| 2007/0260798 A1 * | 11/2007 | Griffin, Jr. | ......... | 710/303 |
| 2010/0195279 A1 * | 8/2010 | Michael | ......... | 361/679.41 |

* cited by examiner

*Primary Examiner* — Anthony Q Edwards

(57) ABSTRACT

A peripheral data storage device for IPHONE mobile phone and IPOD media player devices having an encasement containing a system of electronic circuits which communicates with the IPHONE mobile phone or IPOD media player by means of a host software system and a device software system. The device also has a charge pass through connector and optional card slots. Various views of the device are shown in FIGS. 1-5.

18 Claims, 2 Drawing Sheets

PERIPHERAL STORAGE DEVICE

CROSS-REFERENCE TO RELATED APPLICATIONS

This application claims the benefit of provisional patent application No. 61/106,809, Confirmation Number 1621 filed Oct. 20, 2008 by the above-mentioned inventors.

FEDERALLY SPONSORED RESEARCH

Not Applicable

SEQUENCE LISTING OR PROGRAM

Not Applicable

BACKGROUND

1. Field

This application relates to IPHONE mobile phone and IPOD media player peripherals, specifically to a peripheral device which stores data.

2. Prior Art

Data-intensive applications for the IPHONE mobile-phone and IPOD media player such as PodCasts have increased memory usage at a great rate. Thus, many users are exhausting the built-in memory. These users seek additional memory for their devices. There is no peripheral device that provides a storage solution for these IPOD media player and IPHONE mobile phone users.

DRAWINGS

Figures

REFERENCE NUMERALS

Figure 1:
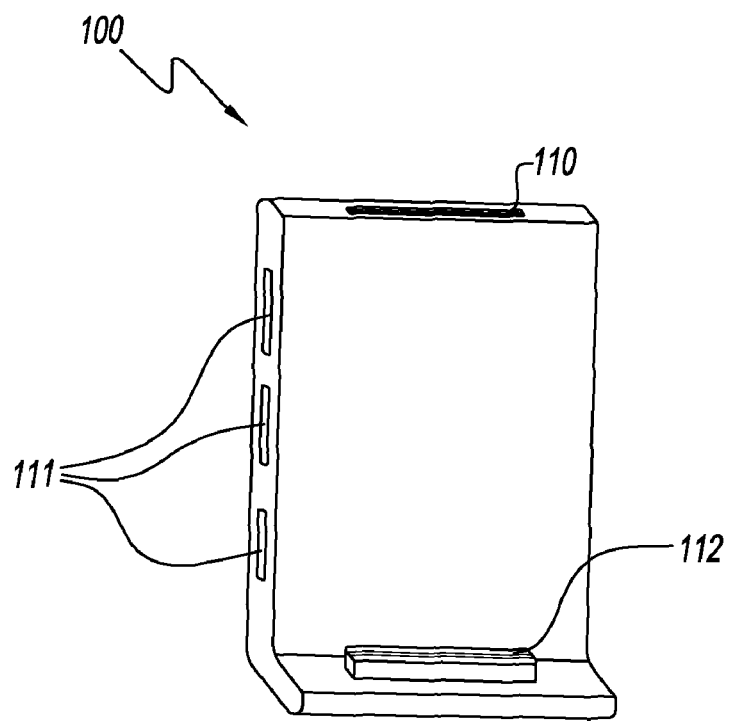
FIG. 1 shows the device disconnected from the IPHONE mobile phone, with dock pass-through connector, optional microSD slots, and dock connector for connection to IPHONE mobile phone.

100 device
110 dock pass-through connector
111 optional microSD slots
112 dock connector for connection to the IPHONE mobile phone

DETAILED DESCRIPTION

Hardware Form Factor (Encasement)

The Form Factor (Encasement) is shown in the drawings:

FIG. 1 shows the device disconnected from the IPHONE mobile phone, with dock pass-through connector, optional microSD slots, and dock connector for connection to IPHONE mobile phone.

Figure 2:
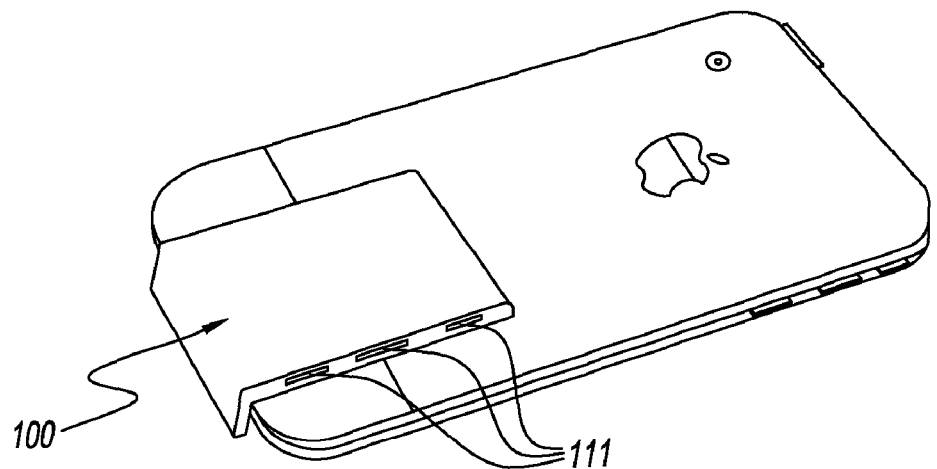
FIG. 2 is a view of the back side of the IPHONE mobile phone with the device connected, showing the optional microSD slots.

FIG. 2 is a view of the back side of the IPHONE mobile phone with the device connected, showing the optional microSD slots.

Figure 3:
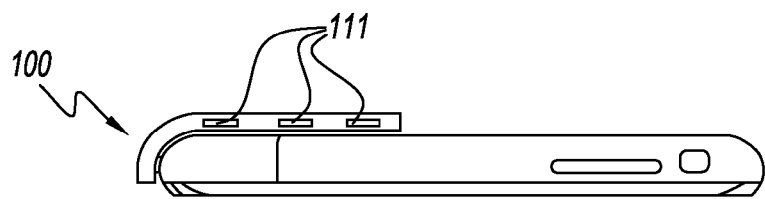
FIG. 3 is a side view of the device on the IPHONE mobile phone, showing the optional microSD slots
Figure 4:
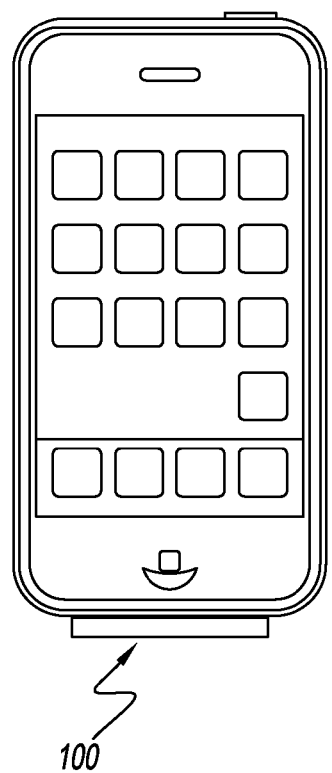
FIG. 4 is a frontal view of the IPHONE mobile phone with the device attached.

FIG. 3 is a side view of the device on the IPHONE mobile phone, showing the optional microSD slots FIG. 4 is a frontal view of the IPHONE mobile phone with the device attached.

Figure 5:
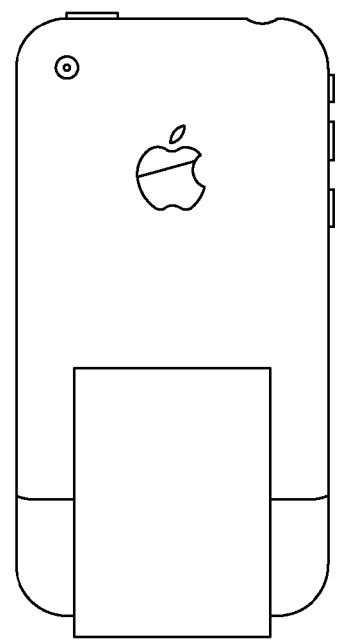
FIG. 5 is a rear view of the IPHONE mobile phone with the device attached.

FIG. 5 is a rear view of the IPHONE mobile phone with the device attached.

Hardware Contents (Sytstem of Electrical Circuits)

The contents of the above packaging will contain any number of the following electrical components as well as any other electrical components which might be necessary for operation:

Memory Components
Memory Cards
Controllers
PCBs
Interconnect
Capacitors
Oscillators
Device Software The software of the storage device will contain any number of the following items as well as any other software that might be necessary for operation of the storage device:

Memory Management Software (Error Correction, Wear Leveling, etc.)
Custom Content (Data, Video, Images, Music, Documents, etc.)
Security
Digital Rights Management
Host (IPOD Media Player or IPHONE Mobile Phone) Software The software of the host (IPOD media player or IPHONE mobile phone) will contain any number of the following items as well as any other software that might be necessary for operation of the host with the storage device:

Host Application Interface Software
Data Translation Software
Memory Management Software
Content
Content Enabling Software
Security
Digital Rights Management

OPERATION

In operation one uses the storage device 100 as an attachment to the IPHONE mobile phone or IPOD media player. The storage device and host software allow the user to record content, store it on the storage device, retrieve the content in a secure way, and display/play the content on the host device. The user may install the host software by downloading it from the Internet. Or, the software may come pre-loaded on either the host or the storage device. Multiple hosts will be able to operate with the same card (device) in accordance with security and digital rights management.

The Pass-through Connector 110 allows the user to connect additional devices (such as chargers) to the IPHONE mobile phone or IPOD media player while keeping the storage device attached and operational.

The optional microSD slots 111 allow the user to insert microSD cards into the storage device and record content, store it on the microSD cards, retrieve the content from the microSD cards in a secure way, and display/play the content from the microSD cards on the host IPOD media player or IPHONE mobile phone device.

ADVANTAGES

From the description above, it is evident that users who need additional memory for their IPHONE mobile phone or IPOD media player now have a peripheral storage device which allows the user to record content, store it on the storage device, retrieve the content in a secure way, and display/play the content on the host device. Previously, these users had no way of extending the memory capabilities of their IPHONE mobile phone or IPOD media player.

CONCLUSION, RAMIFICATIONS, AND SCOPE

Accordingly, the reader will see that content makers (makers of video, music, maps, etc.) application makers (makers of games, GPS, live broadcasting, etc.) are no longer limited by the hardware present on the IPHONE mobile phone and IPOD media player. Instead, content makers and application makers are now liberated to fully leverage the IPHONE mobile phone and IPOD media player platform. Users, too, are freed from the limitations inherent to their IPHONE mobile phone or IPOD media player device. As Moore's law continues to enable more and more memory, controller, and data transmission speed, and greater software power for this peripheral device, there is virtually no limitation to the types of content and applications that can be used with the IPHONE mobile phone and IPOD media player. The devices that have changed the world have now reached their maximum potential to content makers, application makers, and users alike!

We claim:

1. A peripheral storage device for a computing device having a 30 pin connector, said peripheral storage device comprising:
    (a) an encasement for electronic circuits,
    (b) a system of electronic circuits mounted inside said encasement,
    (c) a device software means inside said system of electronic circuits for transmitting and receiving data to and from said computing device, said computing device including a host software means for transmitting and receiving data to and from said system of electronic circuits, and
    (d) said encasement having a vertical rear wall and a horizontal base attached to said vertical rear wall, wherein said horizontal base includes a 30 pin connector to mate with said connector of said computing device,
    whereby said peripheral storage device provides said computing device with direct access to additional incremental storage beyond that built in said computing device.

2. The peripheral storage device of claim 1 wherein said encasement has a pass through connector for connection with said computing device peripheral connections such as a charger.

3. The peripheral storage device of claim 1 wherein said system of electronic circuits includes a memory card or a plurality of memory cards.

4. The peripheral storage device of claim 1 wherein said encasement includes a slot or a plurality of slots for connection to a memory card or a plurality of memory cards.

5. The peripheral storage device of claim 1 wherein said system of electronic circuits includes a controller for the transmission and reception of data to and from said computing device wirelessly.

6. The peripheral storage device of claim 1 wherein said encasement includes a 30 pin dock connector for transmission and reception of data to and from said computing device directly.

7. The peripheral storage device of claim 1 wherein said system of electronic circuits includes a transmitter for the transmission and reception of data to and from said computing device wirelessly and said encasement includes a 30 pin dock connector for transmission and reception of data to and from said computing device directly.

8. The peripheral storage device of claim 1 wherein said computing device is an Apple iPod™ media player.

9. The peripheral storage device of claim 1 wherein said computing device is an Apple iPhone™ mobile phone.

10. A method of expanding the storage of a computing device having a 30 pin connector comprising:
    (a) providing an encasement for electronic circuits, said encasement having a vertical rear wall and a horizontal base attached to said vertical rear wall, wherein said horizontal base includes a 30 pin connector to mate with said connector of said computing device,
    (b) mounting a system of electronic circuits inside said encasement,
    (c) loading a device software means into the said system of electronic circuits for transmitting and receiving data to and from said computing device, and
    (d) loading a host software means into said computing device for transmitting and receiving data to and from said system of electronic circuits, whereby said computing device has direct access to additional incremental storage beyond that built in said computing device.

11. The method of claim 10 wherein said encasement has a pass through connector for connection with said computing device peripheral connections such as a charger.

12. The method of claim 10 wherein said system of electronic circuits includes a memory card or a plurality of memory cards.

13. The method of claim 10 wherein said encasement includes a slot or a plurality of slots for connection to a memory card or a plurality of memory cards.

14. The method of claim 10 wherein said system of electronic circuits includes a controller for the transmission and reception of data to and from said computing device wirelessly.

15. The method of claim 10 wherein said encasement includes a 30 pin dock connector for transmission and reception of data to and from said computing device directly.

16. The method of claim 10 wherein said system of electronic circuits includes a transmitter for the transmission and reception of data to and from said computing device player wirelessly and said encasement includes a 30 pin dock connector for transmission and reception of data to and from said computing device directly.

17. The method of claim 10 wherein said computing device is an Apple iPod™ media player.

18. The method of claim 10 wherein said computing device is an Apple iPhone™ mobile phone.

* * * * *